(12) United States Patent
Knittel

(10) Patent No.: US 8,279,506 B2
(45) Date of Patent: Oct. 2, 2012

(54) REFLECTION TYPE COLLINEAR HOLOGRAPHIC STORAGE SYSTEM

(75) Inventor: Joachim Knittel, Tuttlingen (DE)

(73) Assignee: Thomson Licensing, Issy-les-Moulineaux (FR)

( * ) Notice: Subject to any disclaimer, the term of this patent is extended or adjusted under 35 U.S.C. 154(b) by 638 days.

(21) Appl. No.: 12/322,643

(22) Filed: Feb. 5, 2009

(65) Prior Publication Data
US 2009/0219593 A1    Sep. 3, 2009

(30) Foreign Application Priority Data
Feb. 28, 2008   (EP) ..................................... 08102099

(51) Int. Cl.
*G03H 1/10*   (2006.01)

(52) U.S. Cl. ......................................................... 359/10

(58) Field of Classification Search ........................ None
See application file for complete search history.

(56) References Cited

U.S. PATENT DOCUMENTS
2007/0041066 A1 *  2/2007   Yasuda et al. ..................... 359/9

FOREIGN PATENT DOCUMENTS
WO    WO 2006/075272    7/2006
WO    WO 2007/110840    10/2007

OTHER PUBLICATIONS
Search report dated May 30, 2008.

* cited by examiner

*Primary Examiner* — Derek S Chapel
(74) *Attorney, Agent, or Firm* — Myers Wolin, LLC

(57) ABSTRACT

A reflection type collinear holographic storage system is described, in which an improved overlap between an object beam and a reference beam is achieved. The collinear holographic storage system has a spatial light modulator for imprinting a data page on an object beam, which is located in the beam path of a portion of a reference beam transmitted through a holographic storage medium, whereby the object beam is generated by imprinting a data page onto the transmitted reference beam. The diameter of the reference beam inside the holographic storage medium is matched to the diameter of the object beam.

9 Claims, 4 Drawing Sheets

REFLECTION TYPE COLLINEAR HOLOGRAPHIC STORAGE SYSTEM

This application claims the benefit, under 35 U.S.C. §119, of European Patent Application No. 08102099.2 of 28 Feb. 2008.

FIELD OF THE INVENTION

The present invention relates to a reflection type collinear holographic storage system, in which an improved overlap between an object beam and a reference beam is achieved.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array. Straightforward examples of an SLM are an amplitude SLM, where the pixels with the value '0' block the light, and the pixels with the value '1' transmit or reflect it, and a phase SLM, where the information bits '0' and '1' (or vice versa) are expressed by a phase shift of '0', and 'π', respectively.

In WO 2005/109410 A1 a collinear holographic storage system is disclosed. In this system a reflective spatial light modulator is located in the beam path of a reference beam transmitted through a holographic storage medium. The object beam is generated from the transmitted reference beam and directed towards the holographic storage medium, where it interferes with the reference beam. The collinear setup and the relatively simple optics allow a compact and cost-efficient system. At the same time the available laser power is used very efficiently. As the same light beam is used for the reference beam and the object beam, the required laser power is reduced by a factor of nearly two.

SUMMARY OF THE INVENTION

It is an object of the invention to propose an improved reflection type collinear holographic storage system.

According to the invention, this object is achieved by a collinear holographic storage system with a spatial light modulator for imprinting a data page on an object beam, the spatial light modulator being located in the beam path of a portion of a reference beam transmitted through a holographic storage medium, whereby the object beam is generated by imprinting a data page onto the transmitted reference beam, wherein the diameter of the reference beam inside the holographic storage medium is matched to the diameter of the object beam.

Experimental investigations have shown that the overlap between the reference beam and the object beam is not as good as expected. The diameter of the reference beam is generally smaller than the diameter of the object beam. This means that the holograms are highly low-pass filtered, which leads to a bad quality. By matching the diameter of the reference beam inside the holographic storage medium to the diameter of the object beam, this problem is overcome. The reference beam and the object beam overlap nearly perfectly in the Fourier plane inside the holographic storage medium. Therefore, the holographic material is used very efficiently, which results in a high data capacity.

Advantageously, the diameter of the reference beam inside the holographic storage medium is matched to the diameter of the object beam by shifting the focus of the reference beam relative to the focus of the object beam. This is achieved by placing a first lens in the beam path of the reference beam. A second lens is preferably provided for compensating for a phase modification introduced by the first lens. For optimum compensation, the focal length of the second lens is essentially minus twice the focal length of the first lens. An advantage of using lenses is that they are not very sensitive to misalignment.

Alternatively, the diameter of the reference beam inside the holographic storage medium is matched to the diameter of the object beam by using an uncollimated reference beam. For this purpose advantageously a collimating lens, which is provided for collimating the reference beam emitted by a light source, is slightly shifted. This solution has the advantage that no additional components are needed in the beam path.

According to a further embodiment of the invention, the diameter of the reference beam inside the holographic storage medium is matched to the diameter of the object beam by enlarging the enlarging the focus of the reference beam. This is advantageously achieved with a first phase plate, which is placed in the beam path of the reference beam. A second phase plate is preferably provided for compensating for a phase modification introduced by the first phase plate. For optimum compensation, the phase shift of the second phase plate is essentially minus half the phase shift of the first phase plate. Of course, it is likewise possible to combine the first and the second phase plate with the first and the second lens, respectively. In this way the phase plates support the enlarging of the diameter of the reference beam.

Advantageously, the spatial light modulator reflects the object beam back towards the holographic storage medium. In this way the reference beam and the object beam overlap perfectly in the Fourier plane of the objective lenses, where the holographic storage medium is located. Therefore, the holographic material is used very efficiently, which leads to an increased data capacity. The reflection of the object beam is preferably achieved by a spatial light modulator whose pixels are switchable between a reflective and a transmissive or absorptive state. Amplitude and/or phase influencing spatial light modulators are likewise applicable. Alternatively, a digital mirror device is used. In the latter case the spatial light modulator is advantageously inclined relative to an optical axis. All the above solutions allow to easily direct the light of the switched-off pixels of the data page out of the beam path of the object beam.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
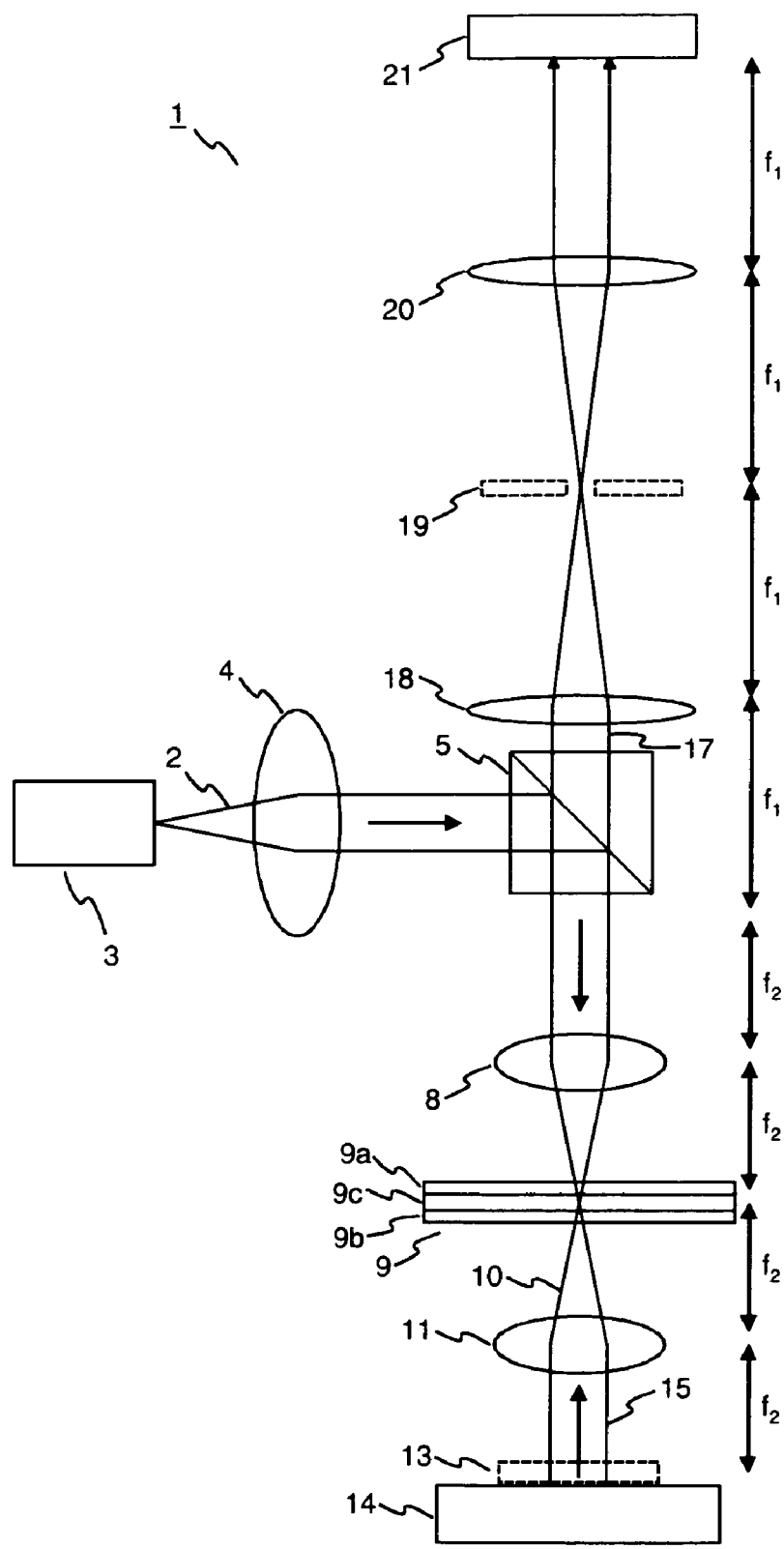
FIG. 1 schematically depicts a known reflection type collinear holographic storage system.

FIG. 1 schematically depicts a known reflection type collinear holographic storage system 1. A laser beam 2 emitted by laser 3 and collimated by a lens 4 is deviated by a non-polarizing beam splitter 5 towards an objective lens 8, which focuses the beam into a holographic storage medium 9. The holographic storage medium has two cover layers 9a, 9b and a hologram layer 9c. A transmitted beam 10 is collimated by a further objective lens 11 and sent through an optional binary phase plate 13 onto a reflective spatial light modulator (SLM) 14. The pixels of the SLM 14 can be switched between a reflective state and a transmissive or absorptive state. The SLM 14 reflects part 15 of the incident light beam 10 back towards the holographic storage medium 9. The binary phase plate 13 is pixel matched with the SLM 14 and reduces the Fourier peak of the reflected beam 15. The light beam 2 that goes from the non-polarizing beam splitter 5 towards the holographic storage medium 9 is the reference beam, whereas the light beam 15 reflected by the reflective SLM 14 towards the holographic storage medium 9 is the object beam. The reflective SLM 14 is used to imprint the data onto the wave data onto the wave front of the object beam 15. The two beams 2, 15 interfere within the holographic storage medium 9 and create a hologram.

For readout the reflective SLM 14 is switched in such a way that no light coming from laser 3 is reflected towards the holographic storage medium 9. The holographic storage medium 9 is illuminated by the light beam 2 emitted by the laser 3 via the objective lens 8. The hologram recorded in the holographic storage medium 9 reflects part 17 of the incident light beam 2, the reconstructed object beam 17, which corresponds to the stored data page. On the return path towards an array detector 21 the reconstructed object beam 17 passes through the non-polarizing beam splitter 5. Optionally, a Fourier filter 19 is introduced between two lenses 18 and 20 forming a 4f imaging system. The Fourier filter 19 allows to cancel high-frequency components generated by the binary phase plate 13. This is especially useful if the binary phase plate 13 is a phase plate consisting of individual pixels.

Figure 2:
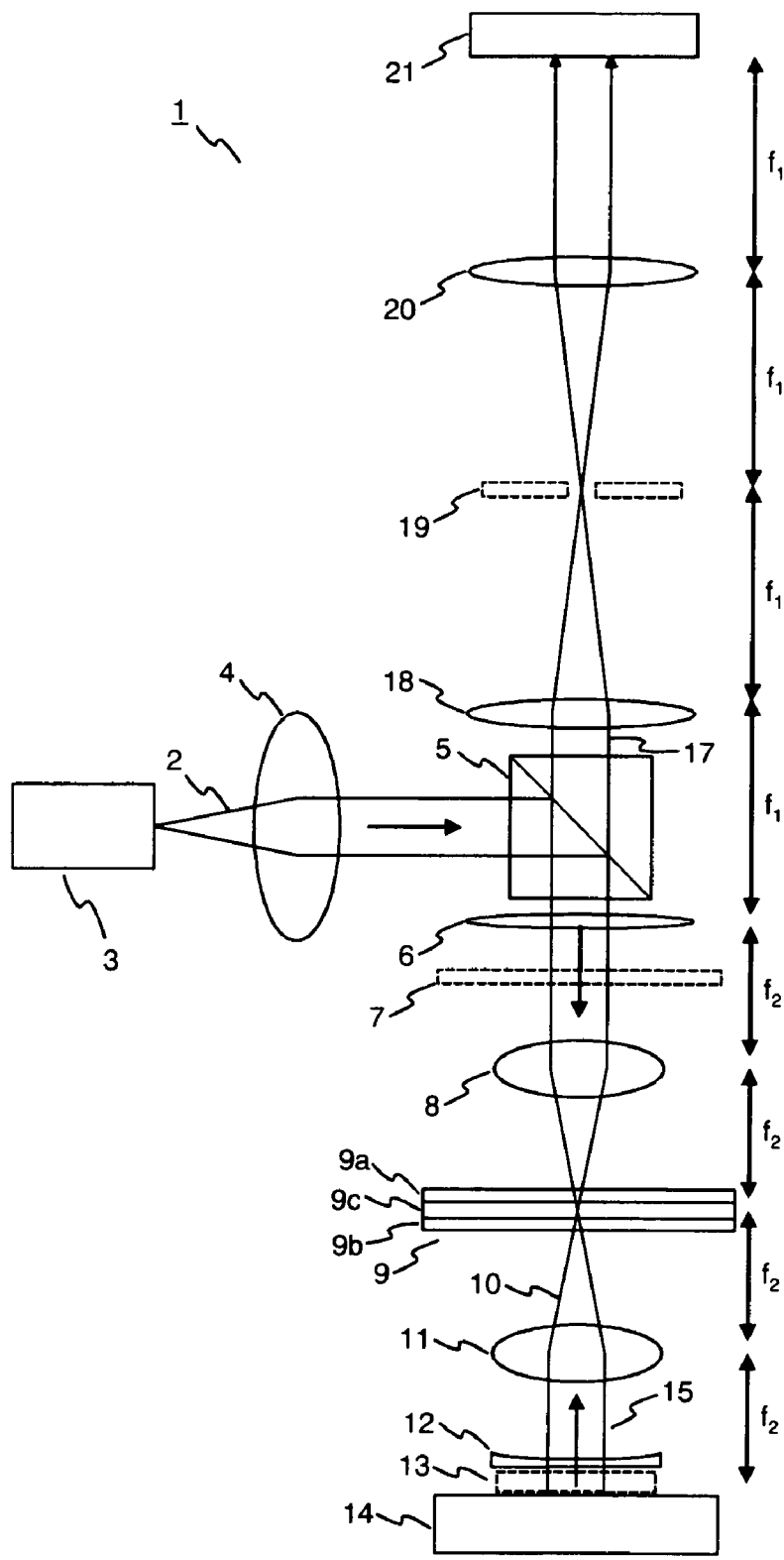
FIG. 2 illustrates a reflection type collinear holographic storage system according to the invention.

A reflection type collinear holographic storage system 1 according to the invention is illustrated in FIG. 2. The holographic storage system 1 is identical to the system of FIG. 1. However, two additional lenses 6, 12 are included in the beam path. The first lens 6 has a focal length $f_6$ and is arranged between the non-polarizing beam splitter 5 and the objective lens 8. The function of this first lens 6 is to shift the focal spot towards the front of the hologram layer 9c. A second lens 12 with a focal length $f_{12}$ is arranged between the objective lens 11 and the binary phase plate 13. The function of the second lens 12 is to compensate for the phase modification introduced by the first lens 6. Because of the reflective setup the second lens 12 is passed twice. Consequently, the lenses 6, 12 compensate each other if the equation $f_6 = -2 \cdot f_{12}$ is fulfilled. Thus, if the first lens 6 is a convex lens, the second lens 12 is a concave lens.

The non polarizing beam-splitter 5 can be replaced by a polarizing beam-splitter. In this case an additional quarter-wave plate 7 is needed. Of course, it is also possible to place the beam-splitter 5 between the first lens 6 and the objective lens 8. In this way the first lens 6 does not modify the reconstructed object beam 17 on its way to the array detector.

Figure 3:
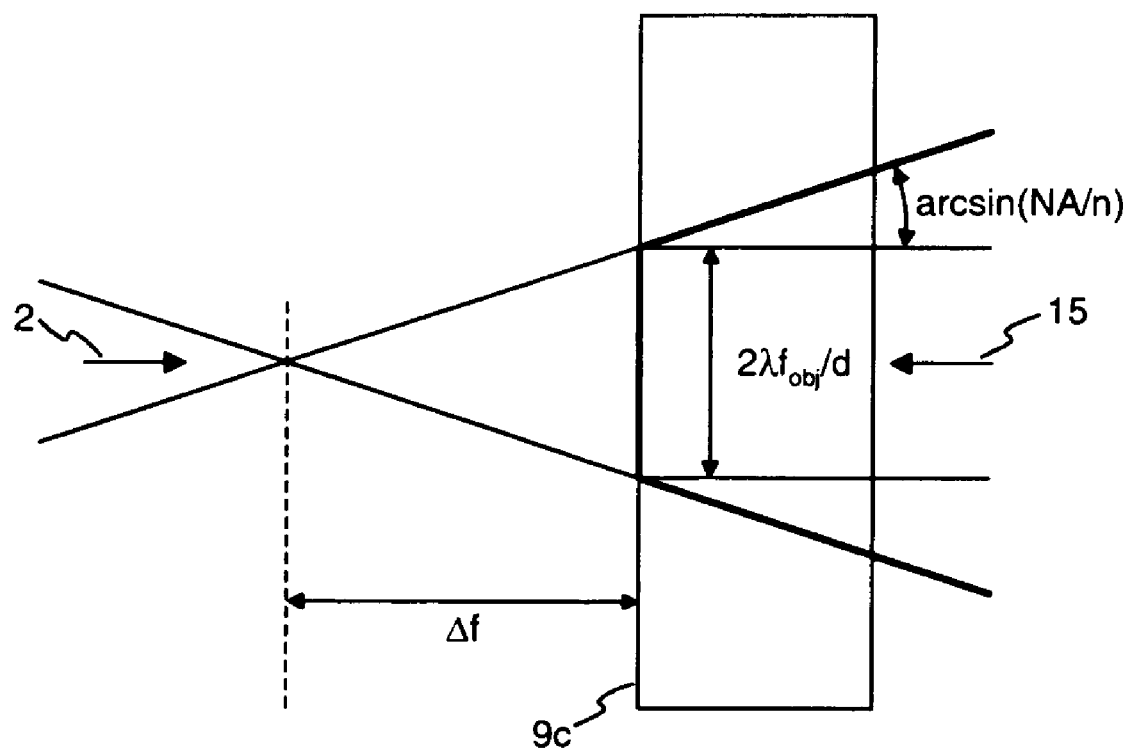
FIG. 3 depicts the focal region of the reference beam and the object beam.

The focal region of the reference beam 2 and the object beam 15 is shown in FIG. 3. The cover layers 9a, 9b are not shown for simplicity. The two additional lenses 6, 12, the SLM 14 and the array detector 21 are all placed in conjugate image planes of different 4f-systems. Consequently, the two additional lenses 6, 12 do not change the diameter of the light beams in any of the conjugate image planes, in particular not at the position of the SLM 14 and at the position of the array detector 21. As can be seen, the focus of the reference beam 2 is shifted by an amount $\Delta f$ towards the front of the hologram layer 9c. As a result, the overlap with the object beam 15 (thick line in FIG. 3) is nearly perfect within the holographic material.

In the following the focal length of the additional lenses 6, 12 shall be calculated for an exemplary holographic storage system. The diameter D of a hologram in the Fourier plane is $D = 2 \cdot f_{obj} \cdot \lambda / d$, where $f_{obj}$ is the focal length of the objective lens 11, $\lambda$ is the wavelength of the object beam 15, and d is the pixel size of the SLM 14. For $f_{obj} = 5$ mm, $\lambda = 405$ nm, and $d = 13.6$ μm the diameter of the hologram in the Fourier plane is 300 μm. The diameter $D_r(x)$ of the reference beam 2 at a distance x from the focus is given by $D_r(x) = 2 \cdot x \cdot NA$. In order to enlarge the focus of the reference beam 2 to 300 μm, the focus needs to be shifted by at least 230 μm.

A simulation with a ray tracing program (ZEMAX) shows that such a focal shift can be achieved if the first additional lens 6 in FIG. 2 has a focal length between 100 mm and 120 mm. Consequently, the focal length of the second lens 12 is between −240 mm and −200 mm. For the simulation it is assumed that the focal length $f_{obj}$ of the objective lenses 8, 11 is 5 mm and that the refractive index of the medium is n=1. For n>1 the same focal length is needed for the additional lenses 6, 12, but the calculation becomes more difficult.

Figure 4:
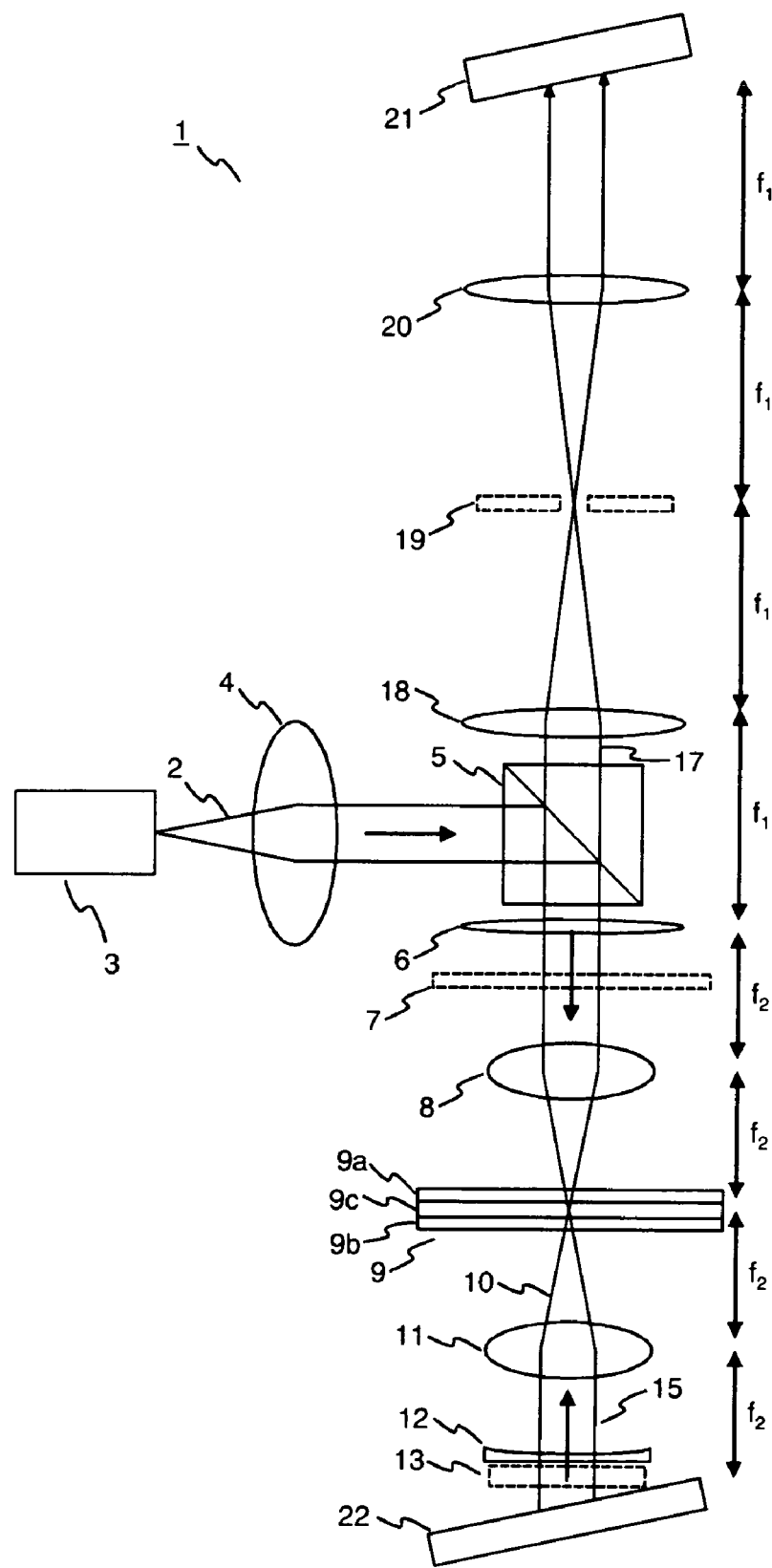
FIG. 4 shows an alternative setup of the holographic storage system according to the invention.

An alternative setup of the holographic storage system 1 according to the invention is shown in FIG. 4. A digital mirror device (DMD) 22 is used as the reflective SLM 14. Typically the DMD 22 has to be rotated by an angle of about 12° relative to the optical axis in order to retro-reflect an incident beam. In order to ensure that the surfaces of the array detector 21 and the DMD 22 are placed in conjugate planes of the 4f systems, the array detector 21 is tilted by the same amount, as shown in the figure. In this way the optical path lengths are kept constant for all pixels.

Instead of the additional lenses 6, 12 it is also possible to use phase plates to enlarge the diameter of the reference beam 2 in the Fourier plane of the hologram. However, the phase shift of the first plate has to be minus two times the phase shift of the second phase plate in the respective location. An advantage of using lenses is that they are not very sensitive to misalignment.

A further alternative is to shift the focus of the reference beam 2 without the additional lenses 6, 12 by using an uncollimated light beam, i.e. by shifting the collimating lens 4. In this case the also the path of the object beam 15 is modified, which leads to an increased diameter of the hologram in the Fourier plane. This corresponds to a reduction of the maximum data density.

Preferentially the holographic storage medium 9 is anti reflection coated in order to reduce reflections. At the same time the cover layers 9a, 9b should be rather thick, so that reflections at the outer layers of the holographic storage medium 9 do not create unwanted holograms. The total thickness of the holographic storage medium 9 may for example amount to 3 mm. Thick cover layers 9a, 9b mean that the diameter of the reflected beams is large, so that the unwanted holograms are very weak.

What is claimed is:

1. A collinear holographic storage system with a spatial light modulator for imprinting a data page on an object beam, the spatial light modulator being located in a beam path of a portion of a reference beam transmitted through a holographic storage medium, whereby the object beam is generated by imprinting a data page onto the transmitted reference beam, wherein a diameter of the reference beam inside the holographic storage medium is matched to a diameter of the object beam by shifting a focus of the reference beam relative to a focus of the object beam with a first lens.

2. The collinear holographic storage system according to claim 1, further comprising a second lens for compensating for a phase modification introduced by the first lens.

3. The collinear holographic storage system according to claim 2, wherein the focal length of the second lens is essentially minus twice the focal length of the first lens.

4. Collinear holographic storage system according to claim 1, wherein the diameter of the reference beam inside the holographic storage medium is matched to the diameter of the object beam by using an uncollimated reference beam.

5. Collinear holographic storage system according to claim 1, wherein the diameter of the reference beam inside the holographic storage medium is matched to the diameter of the object beam by enlarging the focus of the reference beam.

6. Collinear holographic storage system according to claim 1, wherein the focus of the reference beam is enlarged with a first phase plate.

7. Collinear holographic storage system according to claim 6, further having a second phase plate for compensating for a phase modification introduced by the first phase plate.

8. Collinear holographic storage system according to claim 7, wherein the phase shift of the second phase plate is essentially minus half the phase shift of the first phase plate.

9. A method for collinear holographic data storage, comprising:
   illuminating a reference beam onto a holographic storage medium;
   imprinting a data page onto a portion of the reference beam transmitted through the holographic storage medium for obtaining an object beam;
   illuminating the object beam onto the holographic storage medium; and
   generating a hologram in the holographic storage medium by interference between the reference beam and the object beam, wherein a diameter of the reference beam inside the holographic storage medium is matched to a diameter of the object beam by shifting a focus of the reference beam relative to a focus of the object beam with a first lens.

* * * * *